March 11, 1969     SHUNPEI KAWANAMI     3,431,709

DUST COLLECTOR

Filed Sept. 25, 1967

United States Patent Office 3,431,709
Patented Mar. 11, 1969

3,431,709
DUST COLLECTOR
Shunpei Kawanami, Naka-gun, Kanagawa-ken, Japan, assignor to Kabushiki Kaisha Sanko Seisakusho, Kanagawa-ken, Japan
Filed Sept. 25, 1967, Ser. No. 670,284
U.S. Cl. 55—302    3 Claims
Int. Cl. B01d 29/24, 29/38, 33/08

ABSTRACT OF THE DISCLOSURE

A dust blowing device intended for blowing off dust accumulated on the filtering medium, such as wool felt, comprises a first set of piston and cylinder means designed for producing an air blast on the filtering medium and located on top of the same in the passage of filtered air and a second set of piston and cylinder means located on top of the first set and having its piston connected to that of the first set so as to actuate the latter by action of compressed air supplied through a magnet controlled valve connected to the second set. A sealing means of flexible material having a number of fins allowing for irregularities is provided between the piston and the cylinder of the first set.

---

The present invention relates to a dust collector of bag filter type, more particularly a dust collector of bag filter type having a dust blowing device for instantaneously removing the dust collected on meshes of the filtering screen.

Among the prior art dust collectors, there are several types, which have been operated successfully, such as a reverse jet type or pulse air type. However, the reverse jet type is not economical in terms of initial and operational cost, and the pulse air type can not be used at a high back pressure.

The present invention is devised to overcome those disadvantages of the prior art dust collectors as described hereinabove.

An object of the present invention is to provide a dust collector of bag filter type having a simple dust removing device including a pneumatically operated piston moving in a cylinder located in a passage of filtered air.

Another object of the present invention is to provide a compact dust removing device for the dust collector which means is constructed economically and operated easily.

According to the present invention, there is provided a dust collector of bag filter type having a dust blowing device including a casing having an inlet for air to be filtered and an outlet for cleaned air, and a filtering screen member located within said casing, characterized in that said dust blowing device comprises a first cylinder means located in air passage between said filtering screen and said air outlet of said casing and having a plurality of air ports in peripheral wall thereof, a first piston means moving in said first cylinder means and having a piston rod connected thereon, a second cylinder means located above said first cylider means with a partition plate disposed therebetween, a second piston means moving in said second cylinder means and connected to said piston rod on said first piston means with a coil spring disposed between said second piston means and said partition plate, and a magnetic valve for controlling a supply of air into said second cylinder means.

The invention will be more fully understood from the following description thereof when considered in connection with the accompanying drawings in which.

Figure 1:
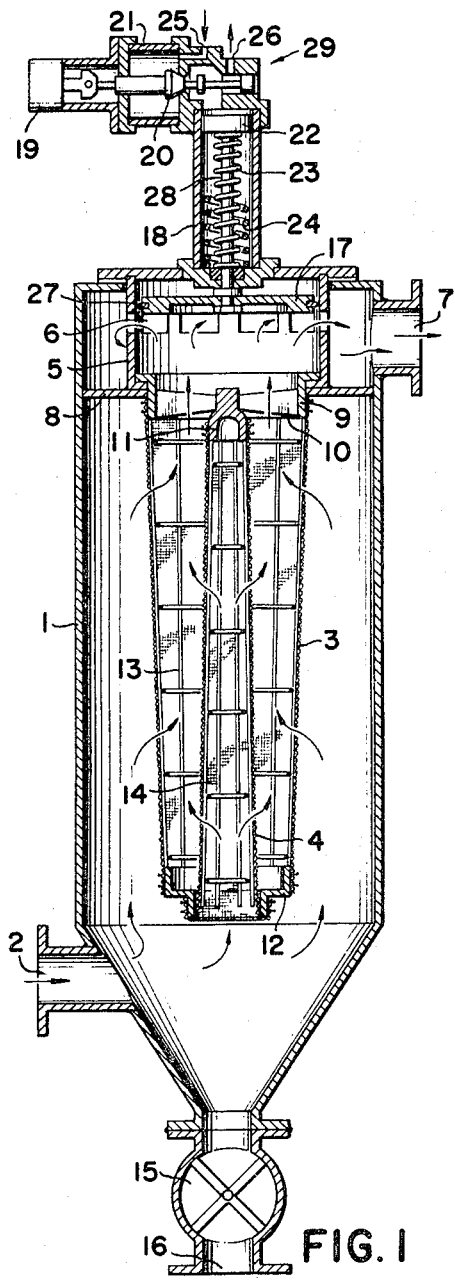
FIG. 1 is a vertical section view showing the dust collector incorporating the dust blowing device according to the present invention.

Referring to the drawings, particularly to FIG. 1, a casing 1 is provided with an inlet opening 2 for introducing air to be cleaned. Dust tubes or bag filters 3, 4 comprising filtering screens of suitable mesh are mounted on a horizontal panel 8 located in the upper part of the casing 1. For this purpose, an annular ring 9 having a horizontal flange at the top end thereof is disposed between the horizontal panel 8 and the dust tubes 3 and 4, with a lower end of the ring 9 connected to the dust tubes 3, 4. The annular ring 9 is provided with radial ribs 10 on which an upper end 11 of the inner dust tube 4 is secured. The dust tubes 3 and 4 are supported at the lower ends by a collar 12 which is constructed so as to prevent any dust from penetrating into the space between both dust tubes 3 and 4. Suitable cages 13 and 14 are located respectively within the dust tubes 3 and 4. The casing 1 is provided with a conventional dust discharging means 15 having a rotary valve 15 therein.

In the dust blowing device according to the present invention, a cylinder 5, having a diameter larger than that of the above-mentioned annular ring 9, is mounted on the horizontal panel 8 in alignment with the annular ring 9. The cylinder 5 is provided in the upper part thereof a number of air ports, and accommodates a piston 17 loosely fitted therein. During filtering operation, the piston 17 is lifted up, clearing the air ports 6, thereby causing the filtered air to pass freely from the dust tubes 3 and 4 to the outlet 7 through the air ports 6.

Another cylinder 18 having a diameter less than that of the cylinder 5 is fixedly mounted on a cover plate on top of the cylinder 5. And another piston 22 is movably fitted into the air cylinder 18, and connected with the above-mentioned piston 17 by means of a piston rod 28. A coil spring 23 is inserted between the piston 22 and the cover plate of the cylinder 5 and adapted to surround the piston rod 28 so as to maintain normally the piston 22 in a raised position. A cushion spring 24 is fitted over the coil spring 23.

A valve 29 is mounted on the air cylinder 18 at the top end thereof to control the air supply into the same. The valve 29 comprises a valve casing or chamber 21, a valve poppet 20, a control magnet 19 connected to the valve poppet 20, and an air inlet 25 and outlet 26. The air inlet 25 is connected to a suitable source of compressed air.

Now, operation of the dust blowing device according to the present invention will be described hereinbelow. The valve poppet 20 is first pulled to the left in FIG. 1 to open the valve by actuating the electromagnet 19. Then, compressed air will enter the second air cylinder 18 through the air inlet 25 and the valve 2, and push downwardly the piston 22, and hence the piston 17. When the piston 17 closes all of the air ports 6 in the wall of cylinder 5 during the first part of its downward stroke, through which ports 6 treated or filtered air passes from the inlet 2 to the outlet 7 during normal filtering operation, it will produce a backward pressure or blast on the filtering screen on the dust tubes 3 and 4, thereby blowing off the dust deposited on the mesh of the screen. After completion of a dust blowing operation, the piston 22 and hence 17 will be brought back to the normal, i.e. upper position by means of the coil spring 23, thereby discharging the air within the cylinder 18 through the outlet 26. And then, the normal filtering operation will be resumed.

At this point, it is noted that effective displacement of the piston 17 is made approximately 30 percent of the volumetric capacity of a bag formed by the dust tubes in order to produce a substantial pressure within the bag. Also, inner diameter of the cylinder 5 is made greater than that of the bag and the piston 17 is pushed down at a high speed in order to increase the pressure within the bag. For this purpose, the volumetric capacity of the air chamber 21 is made sufficiently great to accumulate a suitable amount of air in it and a bore or opening in a seat of the air supply valve 29 is made large enough to deliver a necessary amount of air quickly into the second cylinder 18. As a result, air accumulated in the air chamber 21 at high pressure will quickly push the piston 22 downwardly in the cylinder 18 at the instant when the valve poppet 20 is opened. Since the air is not compressed in the cylinder 5 until all the ports 6 are closed by the piston 17, the latter will be accelerated by that time. A rapid compression of air will occur so as to apply an impact onto the bag simultaneously with closing of the air ports 6.

Arrangements have been made to prevent the piston 17 from hitting the bottom of the cylinder 5 with undue stress. For this purpose, the bore of the air inlet 25 is made sufficiently small and the volumetric capacity of the air chamber 21 is adequately selected to have a pressure in the air chamber 21 reduced substantially to the atmospheric pressure at the end of the downward stroke of the piston 17.

In a preferred embodiment of the dust blowing device according to the present invention, it will take for the piston 17, 0.1 second to come down to the bottom of the cylinder 5, 1.9 seconds to stay therein, and 1.0 second to return to the uppermost position. If the dust collector continues its filtering operation for 27 seconds, the dust blowing operation will be carried out every thirty (30) seconds. Then, the size of bore of the air inlet 25 and volumetric capacity of the air chamber 21 may be selected so as to have the necessary volume of air replenished into the air chamber 21 during the period of twenty-seven (27) seconds. A period of approximately two (2) seconds, during which the piston 17 will stay in the lowermost position in the cylinder 5, is necessary for the dust deposited on the mesh to completely settle in the bottom of the dust collector so as to prevent the same dust from being deposited again on the mesh.

In order to raise the piston 17 back to the uppermost position, the valve poppet 20 will be moved to the right to close the valve 29 and the air outlet 26 will be opened simultaneously by action of the magnet 19, thereby discharging the air within the cylinder 18 and then the pressure of the spring 23 is exerted on the piston 22.

As shown in FIG. 1, a filtering member of the dust collector according to this invention comprises two dust tubes 3 and 4, having one embraced within the other, so as to increase the effective filtering surface.

In case of a wool felt used as a filtering medium, collected dust forming a cake on the screen can be blown off in the early stage by the impact before the bag is fully expanded, thereby extending the life of the filtering medium. Any dust clogging the interior structure of the felt will be easily removed during remaining part of the stroke of the piston 17 after the cake-like dust has been blown off.

Figure 2:
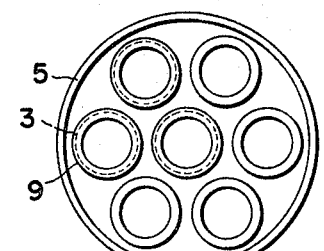
FIGS. 2 and 3 are plan views showing variations of the dust tubes for filtering air to be cleaned.

FIG. 2 shows a variation of the dust tube according to this invention. In this case, there are provided a number of, e.g. seven, dust tubes of smaller size in a single cylinder 5 so as to increase the effective filtering surface of the unit. This variation is preferably used on a small-sized dust collector having a cylinder bore of 16 inches.

Figure 3:
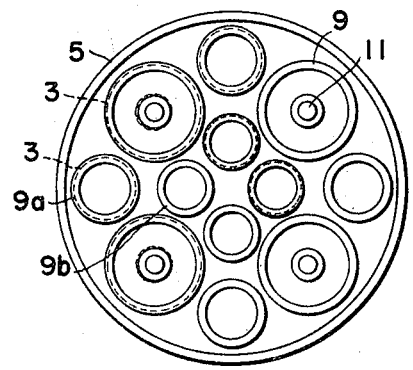

FIG. 3 shows another variation of the dust tube, wherein a number of dust tubes of different size are secured on a single cylinder 5 for the same purpose. As shown in FIG. 3, four double-bags each having both annular ring 9 and cap 11 are mounted on a single cylinder 5. Moreover, eight single bags each having an annular ring 9a or 9b are mounted on the same cylinder 5 between those four double-bags.

Figure 4:
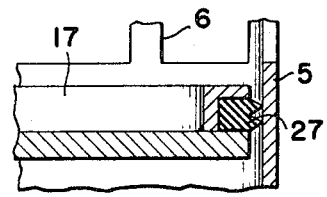
FIGS. 4 and 5 are vertical section views showing sealing means disposed between the first cylinder means and the first piston means moving therein.
Figure 5:
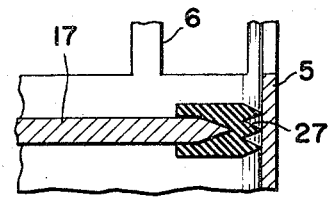

As shown in FIGS. 4 and 5, a special gasket 27 of flexible material, such as rubber, plastics, aluminum, white metal, carbon, having a number of fins is mounted on the piston 17 in the circumference thereof. Since the cylinder 5 is fabricated simply by rolling a flat plate, without finish machining, for the reason of cost reduction, this gasket will compensate for irregularities between the piston 17 and the cylinder 5. For the dust collector operating at high temperature, a gasket of soft metal may be preferably used.

In the dust collector of bag filter type according to this invention, wool felt or non-woven fabrics will be used as a filtering medium.

As described hereinabove, the dust collector according to this invention is advantageous in that the whole unit is made compact, provided with very few moving parts, and will consume a small amount of power.

What is claimed is:

1. A dust collector comprising a casing having an inlet for air to be filtered and an outlet for cleaned air, a filter screen member in said casing between said inlet and outlet including a peripheral wall, means in said casing for preventing by-pass of the filter screen member by the air to be filtered, means proximate said outlet in the path of flow of the air to block passage to the outlet and produce a pressure air pulse acting on the filter screen member to clean the same, the latter means comprising a first vertical cylinder disposed in the path of flow of the air between the filter member and said outlet, said filter member being vertically disposed and said cylinder being located above the upper edge thereof and secured thereto, said cylinder wall being provided with a plurality of ports therein at the downstream end thereof to permit passage of air from the filter member to said outlet, a first piston slidably supported in said cylinder for displacement between a first position in which the ports are entirely in open communication with the filter screen member and a second position in which flow communication between the filter screen member and the ports is entirely blocked by the piston, a piston rod on said first piston, a second vertical cylinder located above the first cylinder, a partition between said cylinders, a second piston slidably supported in the second cylinder and connected to said piston rod to operate the first piston when the second piston is displaced in the second cylinder, spring means between said second piston and partition acting on said partition and the second piston to urge the latter to a position in the second cylinder such that the first piston is caused to assume the first position thereof providing flow communication between the filter screen member and the outlet, a fluid pressure device for operating said second piston in the second cylinder in opposition to said spring means to cause fluid to enter said second cylinder to move said second piston which moves said first piston blocking flow communication between the filter screen member and said outlet and magnetic valve means for controlling the operation of the fluid pressure device.

2. A collector as claimed in claim 1 wherein said filter screen member is annular and is suspended below said second cylinder.

3. A collector as claimed in claim 2 wherein said means for preventing by-pass of air to be filtered causes said flow of air from outside the filter member to the interior thereof, said second cylinder being in communication with the interior of the filter member.

References Cited

UNITED STATES PATENTS 337,486    3/1886    Derham _____ 210—332

(Other references on following page)

UNITED STATES PATENTS

| | | | |
|---|---|---|---|
| 1,734,325 | 11/1929 | Cannon | 210—332 |
| 2,035,592 | 3/1936 | Christensen | 210—323 |
| 2,338,418 | 1/1944 | Forrest et al. | 210—412 |
| 2,338,419 | 1/1944 | Forrest et al. | 210—412 |
| 2,855,100 | 10/1958 | Findlay | 210—412 |
| 2,976,953 | 3/1961 | Haas et al. | 55—341 |
| 3,167,415 | 1/1965 | Edwards | 55—302 |
| 3,332,217 | 7/1967 | Rymer | 55—302 |
| 3,349,914 | 10/1967 | Kudlaty | 210—341 |
| 3,365,065 | 1/1968 | Varjabedian | 55—302 |

HARRY B. THORNTON, *Primary Examiner.*

BERNARD NOZICK, *Assistant Examiner.*

U.S. Cl. X.R.

55—341; 210—323, 412